(12) United States Patent
Dellow et al.

(10) Patent No.: US 6,774,681 B2
(45) Date of Patent: Aug. 10, 2004

(54) SWITCHABLE CLOCK SOURCE

(75) Inventors: Andrew Dellow, Minchinhampton (GB); Paul Elliott, Bristol (GB)

(73) Assignee: STMicroelectronics Limited, Bristol (GB)

( * ) Notice: Subject to any disclaimer, the term of this patent is extended or adjusted under 35 U.S.C. 154(b) by 0 days.

(21) Appl. No.: 10/157,731

(22) Filed: May 29, 2002

(65) Prior Publication Data

US 2002/0196710 A1 Dec. 26, 2002

(30) Foreign Application Priority Data

May 30, 2001 (EP) .......................................... 01304738

(51) Int. Cl.[7] .............................................. H03K 17/00
(52) U.S. Cl. ...................................... 327/99; 327/298
(58) Field of Search .......................... 327/99, 141, 144, 327/166, 298, 407

(56) References Cited

U.S. PATENT DOCUMENTS 4,855,615 A    8/1989  Humpleman ................ 307/269
5,448,597 A  * 9/1995  Hashimoto .................. 375/354
5,502,409 A  * 3/1996  Schnizlein et al. ........... 327/99
6,239,626 B1 * 5/2001  Chesavage .................... 327/99
6,472,909 B1 * 10/2002 Young ........................... 327/99

FOREIGN PATENT DOCUMENTS

EP        0 969 350 A2    1/2000

* cited by examiner

Primary Examiner—Linh M. Nguyen
(74) Attorney, Agent, or Firm—Lisa K. Jorgenson; Robert Iannucci; Seed IP Law Group PLLC

(57) ABSTRACT

A clock source selector for selecting either a first clock signal A or a second clock signal B in accordance with a switch request signal includes three retiming circuits each consisting of two clocked flip-flops. The switch request signal is first retimed relative to clock A to give a signal P, is then retimed relative to clock B to give a signal Q, and finally is retimed relative to clock A to give a signal R. Selector circuitry operates such that when signal Q is asserted, the second clock signal B is output, when neither signal P nor signal R, as combined by a NOR gate, are asserted, the first clock signal A is output, and at other times a zero level is output. The clock source selector can be used in an integrated circuit to form a glitch-free multiplexer.

30 Claims, 3 Drawing Sheets

SWITCHABLE CLOCK SOURCE

BACKGROUND OF THE INVENTION

1. Field of the Invention

This invention relates to a clock source selector which is capable of switching between two asynchronous clock sources with different clock rates and back again in a glitch-free manner. Such a clock source selector is sometimes termed a glitch-free multiplexer.

2. Description of the Related Art

In integrated circuit technology there is sometimes a need to switch between two clock sources which are unrelated in rate and phase. It is important that in such switching any glitch, or short pulse, is avoided. The generation of a glitch is illustrated in FIG. 1 of the drawings, which shows two clock waveforms A and B. A switch request signal indicates whether clock A is required or clock B. If clock A is required the switch request (SW-RQ) signal takes a low value, and if clock B is required the switch request signal takes a high value. If the switch request signal is used directly to select clock A or clock B, the output shown at the bottom of the figure is obtained. This includes a short pulse at the point of the changeover, which is unacceptable for many applications. A similar glitch can occur when switching back from clock B to clock A. A glitch-free multiplexer is designed to overcome this problem, and thus is designed so as not to violate the minimum acceptable pulse width.

Known glitch-free multiplexers use state machines and are relatively complex and difficult to test. There is a need for a reliable glitch-free multiplexer which is easy to make and to test, which is reliable when having to cope with successive switch requests, and which does not introduce unnecessary delay.

BRIEF SUMMARY OF THE INVENTION

A preferred embodiment of the invention, described in more detail below with reference to the drawings, takes the form of a clock source for selecting either a first clock signal A or a second clock signal B in accordance with a switch request signal. The clock source includes three retiming circuits each consisting of two clocked flip-flops. The switch request signal is first retimed relative to clock A to give a signal P, is then retimed relative to clock B to give a signal Q, and finally is retimed relative to clock A to give a signal R. Selector circuitry operates such that when signal Q is asserted, the second clock signal B is output, when neither signal P nor signal R, as combined by a NOR gate, are asserted, the first clock signal A is output, and at other times a logic one level is output. The clock source can be used in an integrated circuit to form a glitch-free multiplexer.

BRIEF DESCRIPTION OF THE SEVERAL VIEWS OF THE DRAWINGS

The invention will be described in more detail by way of example with reference to the drawings, in which.

DETAILED DESCRIPTION OF THE INVENTION

A preferred embodiment of the invention will now be described with reference to FIG. 2 of the drawings.

Figure 1:
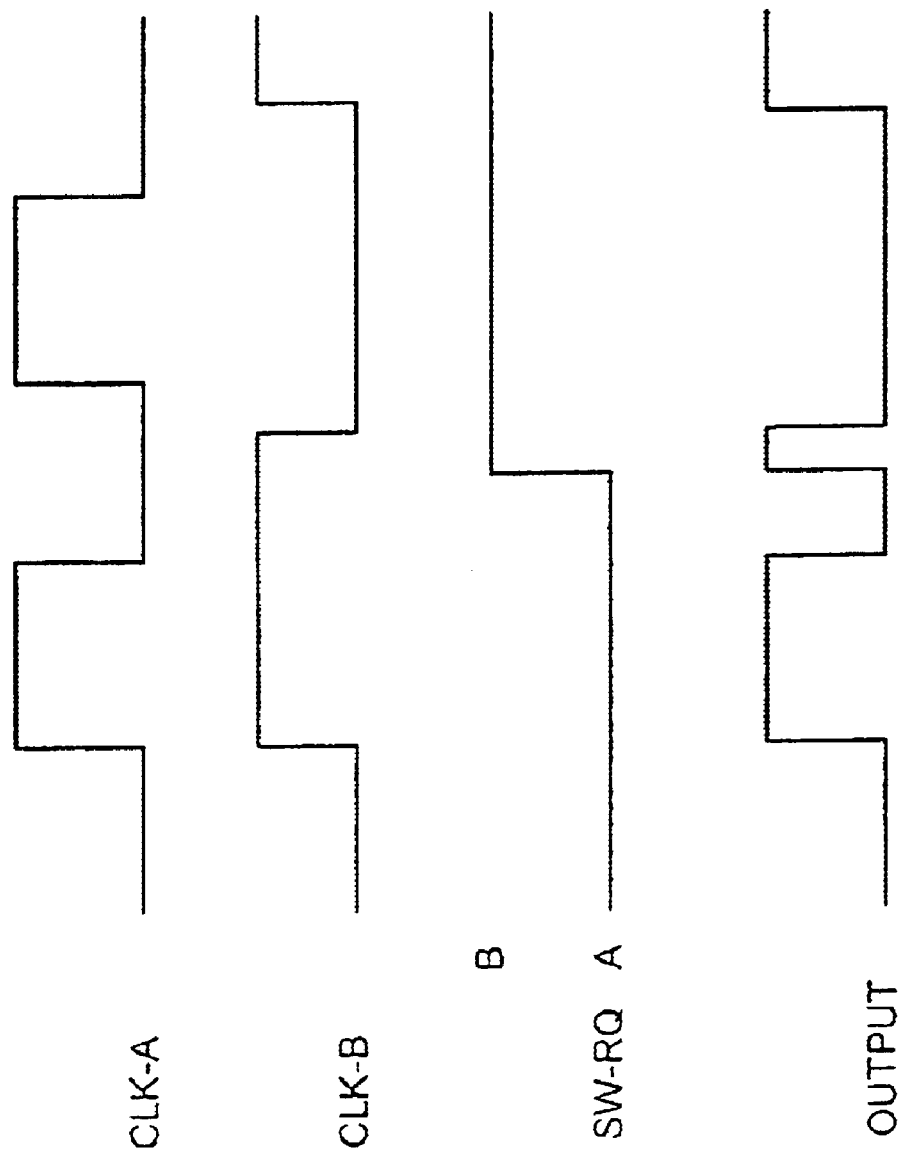
FIG. 1 (referred to above) is a timing diagram illustrating the formation of a glitch.
Figure 2:
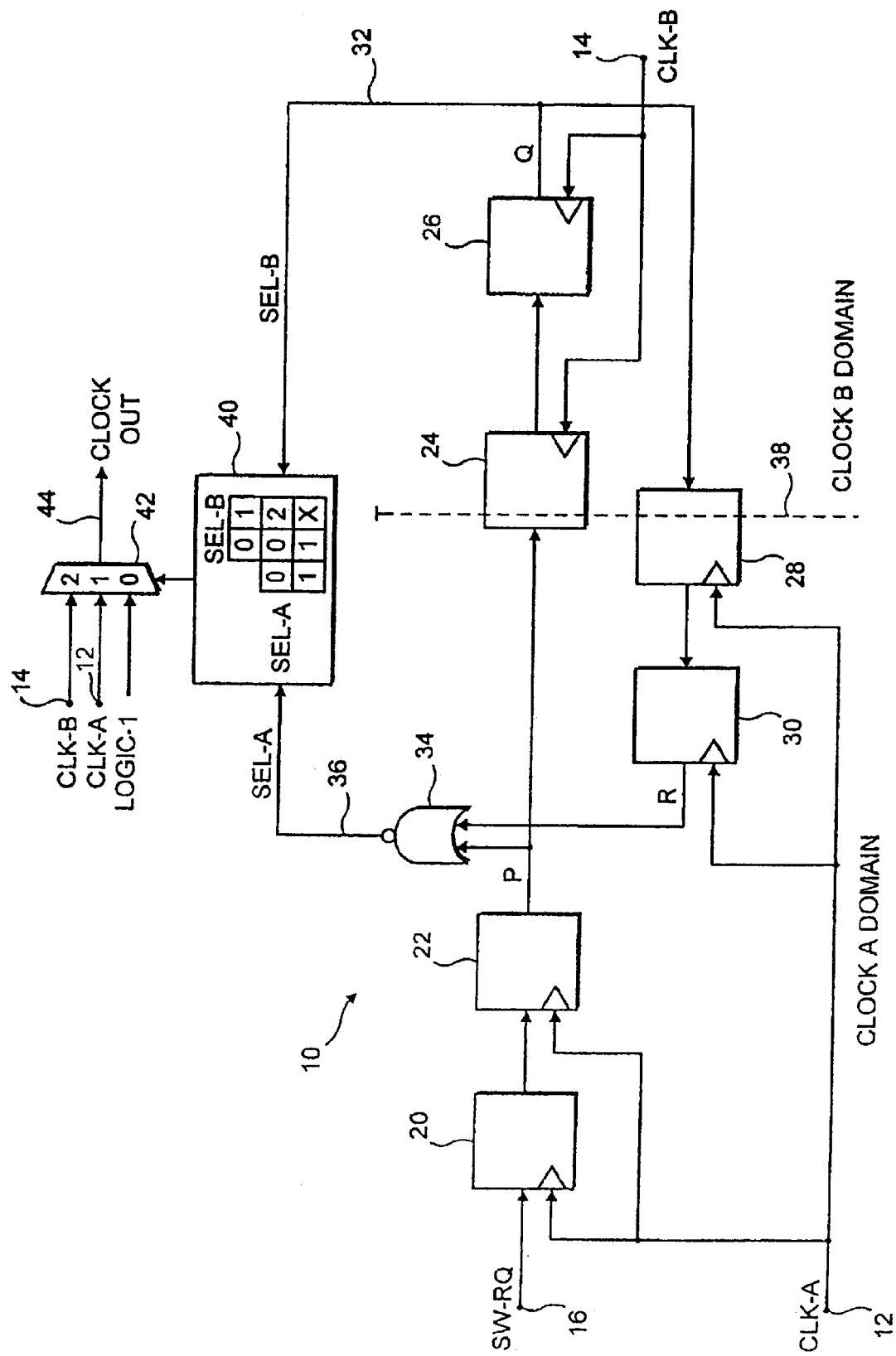
FIG. 2 is a circuit diagram of a glitch-free multiplexer embodying the invention.

The glitch-free multiplexer 10 illustrated in FIG. 2 has an input 12 shown at the bottom left of the Figure for receiving a first clock signal A (CLK-A), an input 14 shown at the right-hand side of the Figure for receiving a second clock signal B (CLK-B), and an input 16 for receiving a switch request signal (SW-RQ). The clocks A and B are asynchronous and unrelated and thus may be of different rate and unrelated phase relationship. The switch request signal is as described above and takes a low value if the output is to follow clock A and a high value if the output is to follow clock B. The switch request signal may therefore be referred to as a 'BnotA' signal.

The construction of the multiplexer 10 is as follows. It is largely constructed from clocked flip-flop or bistable circuits each of which operates to retime the signal applied to its signal input in accordance with a clock input. The switch request signal input is applied to the input of a flip-flop 20 which is connected to input 12 so as to be clocked by clock A. The output of flip-flop 20 is applied to a flip-flop 22 which is also clocked by clock A. The output of flip-flop 22 is supplied to a flip-flop 24 which is connected to input 14 so as to be clocked by clock B. The output of flip-flop 24 is applied to another flip-flop 26 which is also clocked by clock B. The output of flip-flop 26 firstly provides a 'select B' signal SEL-B at an output 32, and secondly is applied to a flip-flop 28 which is connected to input 12 so as to be clocked by clock A. The output of flip-flop 28 is applied to a final flip-flop 30 which is again clocked by clock A. The outputs of flip-flops 22 and 30 are each applied to a respective input of a two-input NOR gate 34, which provides a 'select A' output signal SEL-A at an output 36. The NOR gate 34 provides a high output when and only when both its inputs are low, and is formed by an OR gate with an inverting circuit at its output.

The circuit operates by producing the two outputs SEL-A and SEL-B. These signals are independent to the extent that during a changeover from, say, clock A to clock B, SEL-A is first de-asserted and for a short interval neither SEL-A nor SEL-B is asserted. Then, when it is safe to do so, SEL-B is asserted and clock B takes over.

The manner in which the select signals SEL-A, SEL-B provide an output is also illustrated in FIG. 2. The SEL-A and SEL-B signals are applied to a truth table circuit 40 which controls a four-way selector 42. When both SEL-A and SEL-B are low, a defined logic state such as a logic one input is selected. When SEL-A is high and SEL-B is low, CLK-A is selected by selector 42. When SEL-B is high and SEL-A is low, then CLK-B is selected by selector 42. The situation where both SEL-A and SEL-B are high should not arise, but if it did, selector 42 would select the defined logic state such as logic one again. The provision of the defined logic state by the combination of the truth table 40 and multiplexer 42 prevents propagation of a glitch. As the flip-flops within the circuit all clock on the rising edge of the clock input, the defined logic state is chosen to be logic one. The multiplexer output is thus logic one and held at logic one when switching from one clock to another until the clock output can safely be changed to the new clock domain. The output 44 of the selector 42 provides the clock output of the multiplexer.

The operation of the circuit 10 is as follows. First, in flip-flops 20 and 22 the switch request signal is retimed relative to clock A. In accordance with standard practice two successive retiming stages are used for the sake of safety to avoid metastable state propagation. The retimed output of flip-flop 22 may be termed P. Signal P is then retimed by flip-flops 24 and 26 relative to clock B. The retimed output of flip-flop 26 may be termed Q. Signal Q is then retimed back relative to clock A by flip-flops 28 and 30. The retimed output of flip-flop 30 may be termed R.

The signal Q from flip-flop 26 becomes directly the SEL-B signal. The SEL-A signal is generated from a combination of the signals P and R. More particularly, the SEL-A signal is only generated when both the signal P and the signal R are low (de-asserted).

Figure 3:
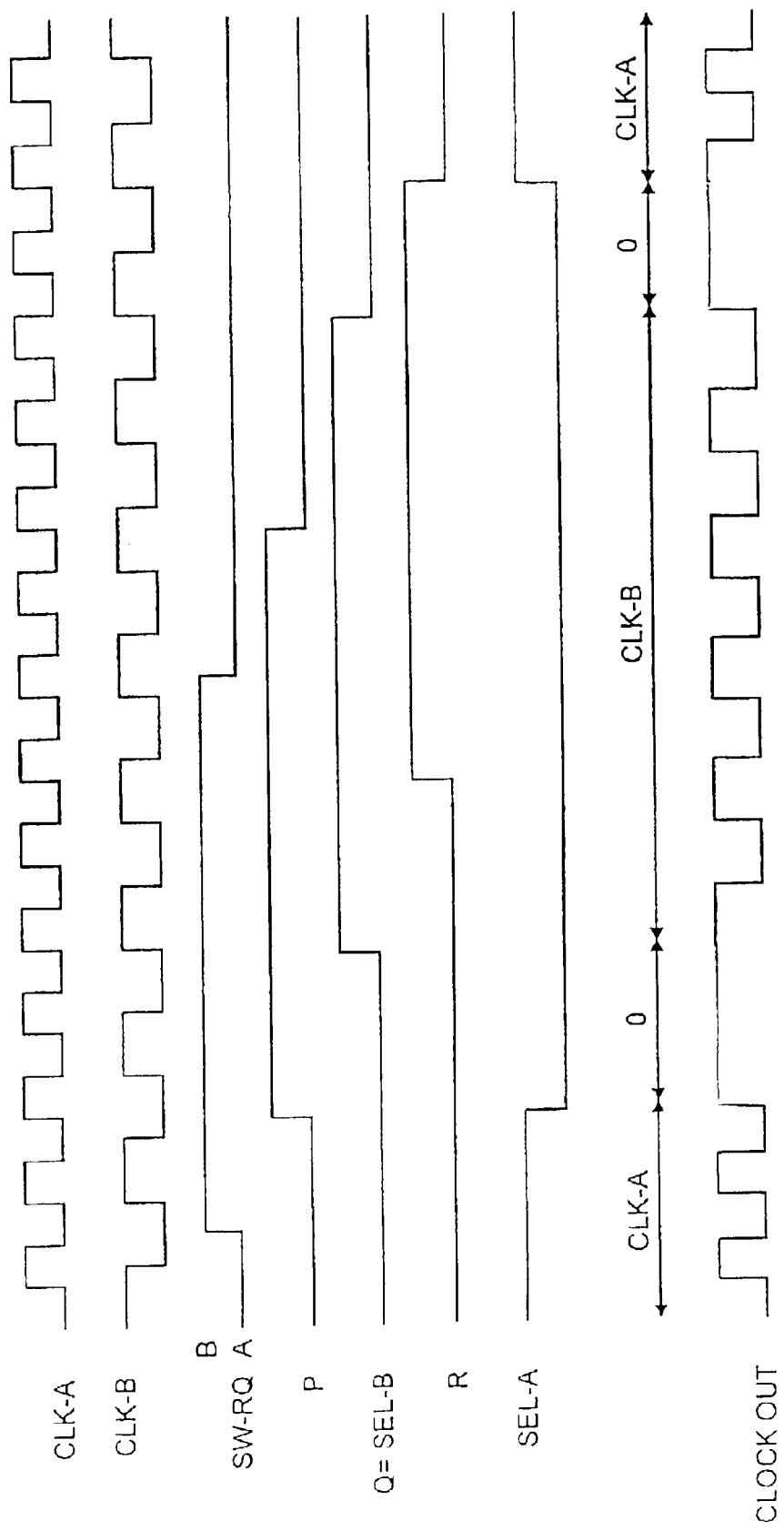
FIG. 3 is a timing diagram illustrating the operation of the multiplexer.

Reference is now made to the waveform diagram of FIG. 3 to illustrate the operation of the multiplexer. The clock A and clock B signals are shown at the top of the Figure. The switch request signal SW-RQ is assumed initially to be low, requesting clock A, and then to change to high, requesting clock B, and subsequently to change back again. The signal P will be generated from the switch request signal and will change state on the second rising edge in clock A after the state change in the switch request signal. The signal Q will be generated from the signal P and will change state on the second rising edge in clock B after the state change in the signal P. The signal R will be generated from the signal Q and will change state on the second rising edge in clock A after the state change in signal Q. The signal Q is also the output SEL-B. Finally the signal SEL-A is true when neither P nor R is high.

Looking at FIG. 3, it is seen that the effect is that all changes in SEL-A coincide with a pulse of CLK-A and all changes in SEL-B coincide with a pulse of CLK-B. Signal P always precedes Q or SEL-B and signal R always comes after Q or SEL-B. Thus by generating SEL-A only when both P is low and also R is low, the pulses of SEL-B are surrounded by intervals when neither SEL-A nor SEL-B are high, and logic one is applied to the clock output 44 of FIG. 2. The resultant clock out signal is shown at the bottom of FIG. 3 and is seen to contain no glitches.

The whole circuit is entirely synchronous to the extent that all the flip-flops are clocked either by clock A or clock B. The clock boundary 38 between the clock A domain and the clock B domain is shown on FIG. 2. The circuit does not require complex state machines, and is relatively easy both to make and to test. It copes quite happily with successive switch requests, for example where a request to change from clock B to clock A follows closely after a request to change from clock A to clock B. The circuit illustrated is particularly suitable for inclusion in a semiconductor integrated circuit.

Various modifications may be made to the glitch-free multiplexer or clock source 10 shown in FIG. 2. If it is known that the switch request signal SW-RQ is always co-timed with clock A, then the flip-flops 20 and 22 can be omitted. In theory, only one flip-flop is needed instead of each of the flip-flop pairs 20, 22; 24, 26; and 28, 30, though this is not preferred for best operation. It does, however, further reduce the delay in the changeover operation. It will be appreciated by those skilled in the art that the logic may be inverted (lows and highs interchanged), either in the circuit as a whole or in selected parts of it, provided that the logical operations effected remain the same. Thus asserting a signal could, in practice, involve taking it from a high value to a low value.

All of the above U.S. patents, U.S. patent application publications, U.S. patent applications, foreign patents, foreign patent applications and nonpatent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A clock source selector for selecting a first clock signal or a second clock signal in accordance with a switch request signal, the clock source selector comprising:

a first clock input for receiving the first clock signal;

a second clock input for receiving the second clock signal;

a switch request signal input for receiving the switch request signal which takes a first value when the first clock signal is required and a second value when the second clock signal is required;

a first retiming circuit coupled to the switch request signal input and connected to the second clock input to receive the second clock signal for retiming relative to the second clock signal;

a retiming input signal applied to the first retiming circuit, the retiming input signal being timed relative to the first clock signal and comprising the switch request signal or a signal derived therefrom;

a second retiming circuit coupled to an output of the first retiming circuit and connected to the first clock input to receive the first clock signal for retiming relative to the first clock signal and the output of the first retiming circuit; and selector circuitry for coupling the second clock input to an output when the output of the first retiming circuit is asserted and for coupling the first clock input to the output when neither the retiming input signal nor an output of the second retiming circuit are asserted, and for providing a defined logic state on the clock output when both the output of the first retiming circuit is asserted and neither the retiming input signal nor output of the second retiming circuit are asserted.

2. A clock source selector according to claim 1, in which the selector circuitry is structured to output the defined logic state when both (i) the output of the first retiming circuit is de-asserted and (ii) either the retiming input signal or the output of the second retiming circuit is asserted.

3. A clock source selector according to claim 1, in which the selector circuitry includes a two-input NOR gate connected to receive the retiming input signal and the output of the second retiming circuit.

4. A clock source selector according to claim 1, further comprising a third retiming circuit coupled between the switch request signal input and the first retiming circuit and connected to the first clock input to receive the first clock signal for retiming relative to the first clock signal.

5. A clock source selector according to claim 1, in which each retiming circuit comprises two retiming stages.

6. A clock source selector according to claim 1, wherein the defined logic state is logic one.

7. A clock source selector according to claim 1, wherein the first and second clock signals are acted on leading edges of the clock signals.

8. A clock source selector according to claim 1, wherein the defined logic state is logic zero.

9. A clock source selector according to claim 1, wherein the first and second clock signals are acted on trailing edges of the clock signals.

10. A clock source selector according to claim 1, wherein the selector circuitry comprises a multiplexer with an input of the defined logic state.

11. A clock source selector according to claim 10, wherein the multiplexer is arranged to directly receive the first clock signal and the second clock signal and to select between the first clock signal, the second clock signal and the defined logic state.

12. A clock source selector according to claim 1 wherein the clock source selector is incorporated in a semiconductor integrated circuit.

13. A clock source comprising:
   first and second clock signals;
   a switch request signal; and
   a clock source selector, including:
      a first clock input for receiving the first clock signal;
      a second clock input for receiving the second clock signal;
      a switch request signal input for receiving the switch request signal which takes a first value when the first clock signal is required and a second value when the, second clock signal is required;
      a first retiming circuit coupled to the switch request signal input and connected to the second clock input to receive the second clock signal for retiming relative to the second clock signal;
      a retiming input signal applied to the first retiming circuit, the retiming input signal being timed relative to the first clock signal and comprising the switch request signal or a signal derived therefrom;
      a second retiming circuit coupled to an output of the first retiming circuit and connected to the first clock input to receive the first clock signal for retiming relative to the first clock signal and the output of the first retiming circuit; and
      selector circuitry for coupling the second clock input to an output when the output of the first retiming circuit is asserted and for coupling the first clock input to the output when neither the retiming input signal nor an output of the second retiming circuit are asserted, and for providing a defined logic state on the clock output when both the output of the first retiming circuit is asserted and neither the retiming input signal nor output of the second retiming circuit are asserted.

14. A clock source selector for selecting a first clock signal or a second clock signal in accordance with a switch request signal, the clock source selector comprising:
   a first clock input for receiving the first clock signal;
   a second clock input for receiving the second clock signal;
   a switch request signal input for receiving the switch request signal which takes a first value when the first clock signal is required and a second value when the second clock signal is required;
   a first retiming circuit having a first input coupled to the switch request signal input, a second input coupled to the second clock input, and an output at which a first retiming signal is produced based on the switched request and second clock signals;
   a second retiming circuit having a first input coupled to the output of the first retiming circuit, a second input coupled to the first clock input, and an output at which a second retiming signal is produced based on the first retiming signal and the first clock input;
   selector circuitry coupled to the first and second retiming circuits and to the first clock input, the selector circuitry being structured to switch an output of the selector circuitry to a defined logic state in response to a state switch in the switch request signal, to the second clock signal in response to a state switch in the first retiming signal, and to the first clock signal in response to a state switch in the second retiming signal.

15. The clock source selector of claim 14, further comprising an intermediate circuit having a first input coupled to the switch request signal input, a second input coupled to the first clock input, and an output coupled to the first input of the first retiming circuit and to the selector circuitry.

16. The clock source selector of claim 14, in which the selector circuitry includes a NOR gate having a first input coupled to the switch request signal input, a second input coupled to the output of the second retiming circuit, and an output.

17. The clock source selector of claim 1, wherein the selector circuitry comprises a multiplexer with a first control input coupled to the output of the NOR gate, a second control input coupled to the output of the first retiming circuit, a first signal input coupled to the first clock input, a second signal input coupled to the second clock input, and an output acting as the selector circuitry output.

18. The clock source selector of claim 10, wherein the multiplexer includes a third signal input that receives the defined logic state.

19. A method of switching an output between a first clock signal and a second clock signal under control of a switch request signal, comprising:
   producing a first retiming signal as a delayed version of the switch request signal, the first retiming signal being delayed under control of the second clock signal;
   producing a second retiming signal as a delayed version of the first retiming signal, the second retiming signal being delayed under control of the first clock signal;
   switching the output to a defined logic state in response to a state switch in the switch request signal;
   switching the output to the second clock signal in response to a first state switch in the first retiming signal; and
   switching the output to the first clock signal in response to a state switch in the second retiming signal.

20. The method of claim 19, further comprising producing an intermediate signal as a delayed version of the switch request signal, the intermediate signal being delayed under control of the first clock signal, wherein the first retiming signal is produced by delaying the intermediate signal.

21. The method of claim 19, further comprising producing an intermediate signal as a delayed version of the switch request signal, the intermediate signal being delayed under control of the first clock signal, wherein the output is switched from the first clock signal to the defined logic state in response to a state switch in the intermediate signal.

22. The method of claim 19 wherein, after switching the output to the defined logic state in response to the state switch in the switch request signal, the output remains in the defined logic state until switched to the second clock signal in response to the first state switch in the first retiming signal.

23. The method of claim 19, further comprising switching the output from the second clock signal to the defined logic state in response to a second state switch in the first retiming signal.

24. The clock source selector according to claim 1 wherein the first retiming circuit is structured to produce the first retiming signal as a logically equivalent, delayed version of the switch request signal and the second retiming circuit is structured to produce the second retiming signal as a logically equivalent, delayed version of the first retiming signal.

25. The clock source according to claim 13 wherein the first retiming circuit is structured to produce a first retiming signal as a logically equivalent, delayed version of the switch request signal and the second retiming circuit is structured to produce a second retiming signal as a logically equivalent, delayed version of the first retiming signal.

26. The clock source selector according to claim 14 wherein the first retiming circuit is structured to produce the first retiming signal as a logically equivalent, delayed version of the switch request signal and the second retiming circuit is structured to produce the second retiming signal as a logically equivalent, delayed version of the first retiming signal.

27. The clock source selector according to claim 14, wherein the first retiming circuit is structured to produce the first retimed signal on a leading edge of the second clock signal and the second retiming circuit is structured to produce the second retimed signal on a leading edge of the first clock signal.

28. The clock source selector according to claim 14, wherein the first retiming circuit is structured to produce the first retimed signal on a trailing edge of the second clock signal and the second retiming circuit is structured to produce the second retimed signal on a wailing edge of the first clock signal.

29. The method of switching an output according to claim 19, wherein the steps of producing the first retiming signal and producing the second retiming signal occur on leading edges of the second and first clock signals, respectively.

30. The method of switching an output according to claim 19, wherein the steps of producing the first retiming signal and producing the second retiming signal occur on trailing edges of the second and first clock signals, respectively.

* * * * *

UNITED STATES PATENT AND TRADEMARK OFFICE
CERTIFICATE OF CORRECTION

PATENT NO.    : 6,774,681 B2
DATED         : August 10, 2004
INVENTOR(S)   : Andrew Dellow et al.

It is certified that error appears in the above-identified patent and that said Letters Patent is hereby corrected as shown below:

Column 5,
Lines 16 and 17, "the, second clock signal" should read as -- the second clock signal --.

Column 8,
Line 5, "wailing edge" should read as -- trailing edge --.

Signed and Sealed this

Fourth Day of January, 2005

JON W. DUDAS
*Director of the United States Patent and Trademark Office*